(No Model.)
J. E. HOLLER.
PLOW.
No. 407,482. Patented July 23, 1889.
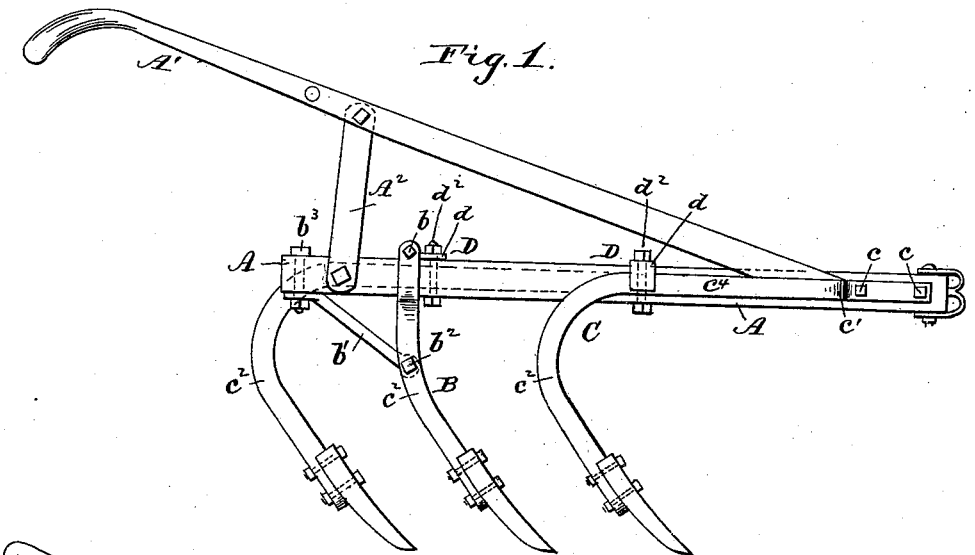
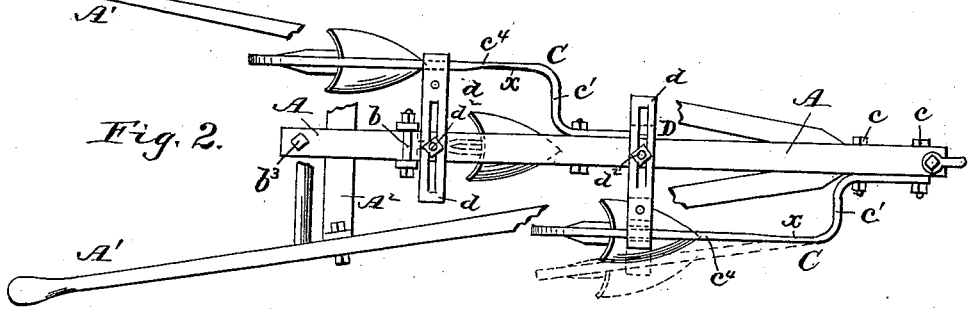
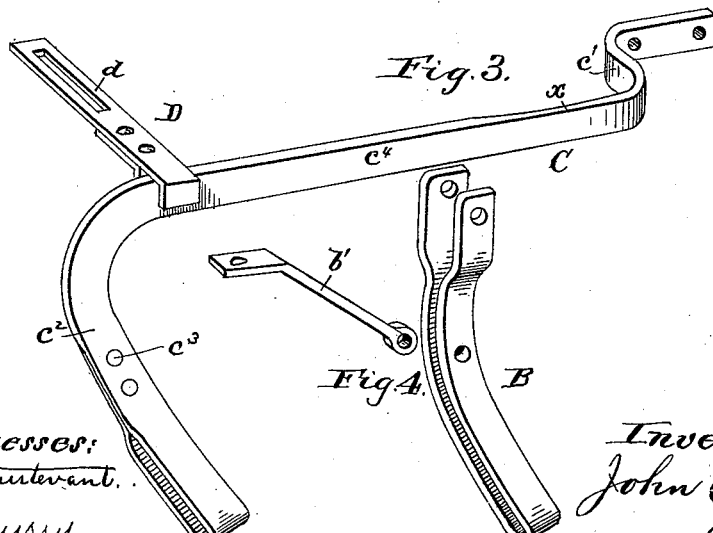
Witnesses:
E. K. Sturtevant.
D. H. Curry.
Inventor:
John E. Holler,
by H. N. Low
atty.

1
UNITED STATES PATENT OFFICE.

JOHN E. HOLLER, OF HUNTERSVILLE, NORTH CAROLINA.

PLOW.

SPECIFICATION forming part of Letters Patent No. 407,482, dated July 23, 1889.

Application filed March 1, 1889. Serial No. 301,609. (No model.)

*To all whom it may concern:*

Be it known that I, JOHN E. HOLLER, a citizen of the United States, residing at Huntersville, in the county of Mecklenburg and State of North Carolina, have invented certain new and useful Improvements in Plows; and I do declare the following to be a full, clear, and exact description of the invention, such as will enable others skilled in the art to which it appertains to make and use the same.

My invention relates to plows or cultivators adapted for the cultivation of cotton, corn, or other crops, its object being to strengthen, simplify, and cheapen the frame of the implement, and at the same time adapt it for the ready attachment of the shares or shovels and their lateral adjustment relative to each other to suit various widths of rows.

With these objects in view my invention consists in the parts and combinations thereof hereinafter more particularly set forth and claimed.

In order to make my invention more clearly understood, I have shown in the accompanying drawings means for carrying the same into practical effect.

In said drawings, Figure 1 is a side view of a plow embodying my invention. Fig. 2 is a plan view of the same. Fig. 3 is a perspective view of one of the spring-arms which carry the side shovels. Fig. 4 is a detail view of a foot and brace.

Referring to the drawings, A indicates the main plow beam or stock, which is provided at its forward end, in the usual or any suitable manner, with means for the attachment of the whiffletree or other draft device.

A' indicates the handles attached at their forward ends to said beam, extending backward and upward, and supported at their rear ends by suitable braces $A^2$.

B is an iron doubled upon itself so as to leave a narrow space between its two parallel portions, and secured at its ends to the beam A, said ends lying for this purpose one on each side of the beam and connected by a clamping-bolt $b$. The lower portion of said iron is bent downward, as seen in Fig. 1, and constitutes the foot for the middle shovel, which travels beneath the plow-stock. The shovel is secured in place by clamping-bolts, which pass through said shovel and through the space between the portions of the iron. By this means a foot or shank of very great strength and rigidity is easily produced, and one upon which the shovel can be most easily secured and adjusted.

$b'$ is a brace, one end of which is provided with an eye situated between the two portions of the foot B, and there secured by a transverse bolt $b^2$. Said brace passes diagonally upward to the plow-stock, and is there attached by a bolt $b^3$.

At C are shown the irons which constitute the shanks or feet for the side shovels of the implement. These irons, while comparatively thin—say one-half inch in a horizontal direction—are of considerable vertical dimension—say one and one-half inch. They are secured firmly at their forward ends to the plow-stock by means of transverse bolts $c$ and extend backward in substantially the same horizontal plane with said stock. At $c'$ these irons are bent outwardly to form offsets, as shown in Fig. 2, and are then continued backward for a distance, which will be in an implement of ordinary size about eighteen inches. At the latter points the irons are bent sharply downward and forward to form the shanks or feet for the side plows, and their lower ends are bent back and upward and lie parallel with and at a short distance from the shank portions to form a clamping-slot substantially similar to that already described in connection with the middle foot B. The extremities of the bent-back portions are securely bolted or otherwise attached to the shank portions $c^2$ at $c^3$. At or near their forward ends the main horizontal arms $c^4$ of the irons C are made sufficiently thin, as indicated at $x$, to be elastic and permit their rear ends with the depending shanks or feet to be sprung inward toward or outward from the plow-stock. It will be seen that by such an adjustment the implement may be adapted to the desired width of cultivation. The forward ends of the iron C are securely attached to the plow-beam, and the vertical dimension of said irons is such that they will be practically rigid against any vertical strain. It remains, therefore, simply to provide clamping devices of a character that may be readily adjusted, and which shall firmly hold the spring-arms $c^4$ laterally at the proper distances from the stock. Such means are shown at D, and consist of iron strips or plates $d$, bolted at their outer ends to or around the horizontal arms $c^4$, or loosely engaging said arms, and extending inwardly therefrom to and across the stock A. By suitable means, such as by longitudinal slots in said plates $d$ and bolts $d^2$, which pass through said slots and through the plow-stock, the inner ends of the parts $d$ may be clamped in place, thus holding and maintaining the horizontal portions or spring-arms of the irons with their shanks and shovels at a greater or less distance from the plow-stock, as may be required.

The mode of operation of the implement has been sufficiently indicated in the foregoing description of its construction.

I am aware that it is not broadly new to mount the shovels of cultivators on laterally-adjustable arms, and intend my claim to be understood as extending only to my improved construction of said arms and means for rigidly holding and easily adjusting the same.

Having thus described my invention, what I claim is—

In a plow or cultivator, the combination, with the stock A, of the rigid arms having the thin spring portions $x$ and carrying the shanks for the side shovels, said arms being secured at their forward ends to said stock and provided at their rear ends with adjustable clamping devices, whereby their latter ends and the shovels may be adjusted to and maintained at the desired distances from the stock, substantially as set forth.

In testimony whereof I affix my signature in the presence of two witnesses.

JOHN E. HOLLER.

Witnesses:
   HUGH W. HARRIS,
   W. G. ERWIN.